R. MITCHELL.
Fruit-Baskets.

No. 106,605.

Patented Aug. 23, 1870.

Witnesses
L. S. Mabee
Chas. Nida

Inventor
R. Mitchell
per Munn & Co.
Attorneys.

United States Patent Office.

RICHARD MITCHELL, OF SMYRNA, DELAWARE.

Letters Patent No. 106,605, dated August 23, 1870.

IMPROVED FRUIT-BASKET.

The Schedule referred to in these Letters Patent and making part of the same.

*To all whom it may concern:*

Be it known that I, RICHARD MITCHELL, of Smyrna, in the county of Kent and State of Delaware, have invented a new and useful Improvement in Fruit-Baskets; and I do hereby declare that the following is a full, clear, and exact description thereof, which will enable others skilled in the art to make and use the same, reference being had to the accompanying drawing forming a part of this specification.

My invention relates to fruit-baskets, and consists in an improved construction thereof, as hereinafter specified.

In the accompanying drawing—

Similar letters of reference indicate corresponding parts.

Figure 1:
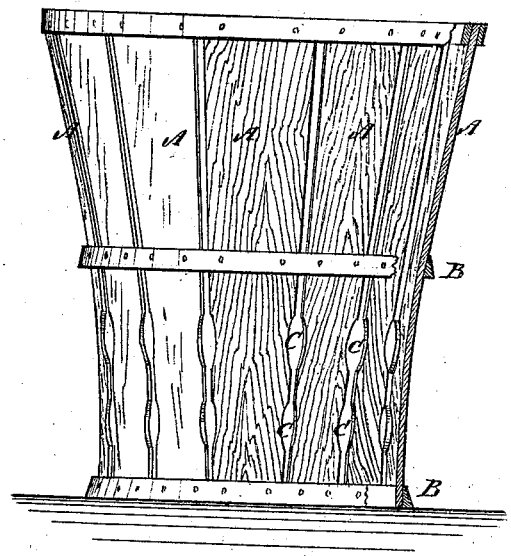
Figure 1 is a view of the basket partly in section.
Figure 2:
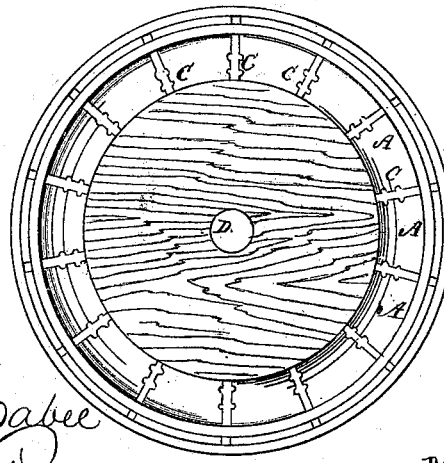
Figure 2 is a view looking down from the top of the basket.

A represents the staves, of which there may be more or less in number.

These staves are curved inward, so that the upper portion of the basket will be bell-shaped, that the sides of the basket may bear a portion of the weight of the fruit, and thereby serve, to a certain extent, to prevent the fruit below from being crushed by the weight above.

B represents the hoops around the bottom and middle of the basket.

These hoops are made beveling, so as to fit the section of the basket to which they are attached, and to give strength and security to the basket This increased thickness of the hoop allows the fastening-nails a much better support than the ordinary thin hoops.

The tops of the staves A are secured by an inner and an outer hoop, secured together by nails through the staves.

C represents orifices in the basket between the hoops, formed by cutting away the edges thereof, and D is a central orifice through the bottom of the basket.

These orifices C and D allow of a free circulation of air through the fruit, especially the lower portion of the contents of the basket, where the danger of spoiling is greatest.

These baskets are more especially designed for holding peaches in the course of their transportation to and sale in market. This delicate fruit requires particular care and attention for its proper preservation.

Being well versed in the business of shipping peaches, I have tried many experiments with a view of perfecting, as far as possible, the process, and have met with signal success in the use of the above-described improved basket.

Having thus described my invention,

I claim as new and desire to secure by Letters Patent—

The inwardly-curved staves A, thickened beveled hoops B, and perforated disk-bottom D, combined in the manner and for the purpose described.

The above specification of my invention signed by me this 28th day of June, 1870.

RICHARD MITCHELL.

Witnesses:
GEO. W. MABEE,
T. B. MOSHER.